(12) United States Patent
Hsu et al.

(10) Patent No.: US 9,030,830 B2
(45) Date of Patent: May 12, 2015

(54) CONTAINING CASE AND ELECTRONIC DEVICE HAVING THE SAME

(71) Applicant: Wistron Corporation, New Taipei (TW)

(72) Inventors: Po-Yuan Hsu, New Taipei (TW);
Hsing-Wang Chang, New Taipei (TW);
Tsung-Hsien Chen, New Taipei (TW);
Chia-Cheng Su, New Taipei (TW);
Ping-Feng Liao, New Taipei (TW)

(73) Assignee: Wistron Corporation, New Taipei (TW)

( * ) Notice: Subject to any disclaimer, the term of this patent is extended or adjusted under 35 U.S.C. 154(b) by 111 days.

(21) Appl. No.: 13/729,033

(22) Filed: Dec. 28, 2012

(65) Prior Publication Data

US 2014/0146488 A1 May 29, 2014

(30) Foreign Application Priority Data

Nov. 27, 2012 (TW) .............................. 101144348 A

(51) Int. Cl.
*G06F 1/16* (2006.01)

(52) U.S. Cl.
CPC ................ *G06F 1/16* (2013.01); *G06F 1/1679* (2013.01)

(58) Field of Classification Search
CPC ............................... H05K 5/0286; G06F 1/16
USPC .......................................... 361/737; 150/147
See application file for complete search history.

(56) References Cited

U.S. PATENT DOCUMENTS

| | | | | |
|---|---|---|---|---|
| 5,334,799 | A * | 8/1994 | Naito et al. ................ | 174/17 VA |
| 5,382,174 | A | 1/1995 | Kinoshita | |
| 5,621,192 | A * | 4/1997 | Bordwell et al. ................ | 174/67 |
| 5,739,500 | A * | 4/1998 | Van Beers .................. | 219/117.1 |
| 8,023,285 | B2 * | 9/2011 | Zhu ................ | 361/810 |
| 8,462,512 | B2 * | 6/2013 | Zhang ............ | 361/737 |
| 8,567,459 | B2 * | 10/2013 | Kitchen .......... | 150/147 |
| 8,625,287 | B2 * | 1/2014 | Liu et al. ................ | 361/726 |
| 2009/0032420 | A1 * | 2/2009 | Zenzai .................. | 206/316.2 |
| 2009/0280670 | A1 * | 11/2009 | Feng ................ | 439/326 |
| 2012/0262618 | A1 * | 10/2012 | Weakly ............ | 348/333.01 |
| 2013/0257346 | A1 * | 10/2013 | Jakins et al. ............... | 320/107 |

\* cited by examiner

*Primary Examiner* — Lisa Lea Edmonds
*Assistant Examiner* — Rashen E Morrison
(74) *Attorney, Agent, or Firm* — Jianq Chyun IP Office

(57) ABSTRACT

A containing case suitable to be installed at an electronic device includes a main body, a cover and an elastic locking element. The cover is pivoted at the main body and has a protrusion portion, in which a side of the protrusion portion has a locking surface and the other side of the protrusion portion has a guiding slope. The elastic locking element is movably disposed at the main body and has a locking portion. When the cover is closed to the main body and drives the protrusion portion to apply force onto the elastic locking element, the elastic locking element is elastically deformed and the locking portion moves along the guiding slope and then crosses the protrusion portion to reach the locking surface so that the cover is locked at the main body by the locking portion.

20 Claims, 5 Drawing Sheets

CONTAINING CASE AND ELECTRONIC DEVICE HAVING THE SAME

CROSS-REFERENCE TO RELATED APPLICATION

This application claims the priority benefit of Taiwan application serial no. 101144348, filed on Nov. 27, 2012. The entirety of the above-mentioned patent application is hereby incorporated by reference herein and made a part of this specification.

BACKGROUND

1. Field of the Disclosure

The disclosure generally relates to a containing case and an electronic device having the same, and more particularly, to a containing case able to automatically lock a cover and an electronic device having the same.

2. Description of Related Art

There are a wide range of integrated circuit cards (IC cards or chip cards), and the smart card is one of the IC cards. The smart card allows a holder to perform a predetermined operation and provides functions of computing, encryption, two-way communication and security, so that, in addition to storing data function, the card is able to protect the stored data.

Electronic devices, such as a notebook computer and other portable devices, can be equipped with a card reader to support reading/writing data function for smart cards or other types of IC cards. Taking a plug-in card reader as an example, a part of the IC card in the plug-in card reader is exposed out of the notebook computer for easily plugging/unplugging. However, the exposing design makes the plug-in card reader unable achieving the performance demand of waterproof, dustproof and drop resistance. A clamshell card reader can make an IC card entirely hidden in the card reader, but if the cover of a clamshell card reader fails to be firmly locked, the capability of waterproof, dustproof and drop resistance thereof may be inadequate due to incompletely locking the cover.

SUMMARY OF THE DISCLOSURE

Accordingly, the disclosure is directed to a containing case, wherein a cover thereof can be easily and firmly locked.

The disclosure is also directed to an electronic device, wherein a cover of the containing case thereof can be easily and firmly locked.

The disclosure provides a containing case suitable to be installed at an electronic device. The containing case includes a main body, a cover and an elastic locking element. The cover is pivoted at the main body and has a protrusion portion, in which a side of the protrusion portion has a locking surface and the other side of the protrusion portion has a guiding slope. The elastic locking element is movably disposed at the main body and has a locking portion. When the cover is closed to the main body and drives the protrusion portion to apply force onto the elastic locking element, the elastic locking element is elastically deformed and the locking portion moves along the guiding slope and then crosses the protrusion portion to reach the locking surface so that the cover is locked at the main body by the locking portion.

The disclosure also provides an electronic device, which includes a casing and a containing case. The containing case includes a main body, a cover and an elastic locking element. The cover is pivoted at the main body and has a protrusion portion, in which a side of the protrusion portion has a locking surface and the other side of the protrusion portion has a guiding slope. The elastic locking element is movably disposed at the main body and has a locking portion. When the cover is closed to the main body and drives the protrusion portion to apply force onto the elastic locking element, the elastic locking element is elastically deformed and the locking portion moves along the guiding slope and then crosses the protrusion portion to reach the locking surface so that the cover is locked at the main body by the locking portion.

In an embodiment of the disclosure, when the cover is closed to the main body, the protrusion portion applies force onto the locking portion of the elastic locking element through the guiding slope.

In an embodiment of the disclosure, an inclination angle of the guiding slope relative to the locking surface is 35 degree.

In an embodiment of the disclosure, the main body has a trench, the elastic locking element includes a rod portion, the rod portion goes through and is disposed in the trench, and the elastic locking element is configured to rotate relatively to the main body by taking the rod portion as a rotation shaft.

In an embodiment of the disclosure, both ends of the rod portion are connected to the locking portion, when the locking portion moves along the guiding slope, the locking portion is gradually far away from the trench and pulls the two ends to bend the rod portion.

In an embodiment of the disclosure, the rod portion has a fulcrum, the fulcrum is located between the two ends, and when the rod portion is bent, the fulcrum leans against an inner wall of the trench.

In an embodiment of the disclosure, a width of the trench is greater than an outer diameter of the rod portion so that the rod portion is suitable to be elastically deformed in the trench.

In an embodiment of the disclosure, the locking portion includes a roller and the roller is configured to contact the guiding slope and roll along the guiding slope.

In an embodiment of the disclosure, the casing has a support surface and the support surface is for supporting the elastic locking element so that the elastic locking element is suitable to be elastically deformed by means of force-applying of the protrusion portion.

In an embodiment of the disclosure, the main body is a card reader and suitable to accommodate an IC card and the cover is suitable to be closed at the main body to cover the accommodation space.

Based on the depiction above, the containing case of the disclosure has an elastic locking element used for locking the cover. When the cover is closed to the main body to make the protrusion portion of the cover apply force onto the elastic locking element, the locking portion of the elastic locking element moves to the locking surface of the protrusion portion by means of the guiding of the guiding slope of the protrusion portion, such that the cover is locked at the main body. Therefore, when the user makes the cover closed to the main body, the elastic locking element, driven by the cover, can automatically lock the cover, which advances the operation convenience of the containing case. In addition, during applying force onto the elastic locking element by the protrusion portion of the cover, the locking portion, by means of the elastic deformation of the elastic locking element, can move along the guiding slope, cross the protrusion portion and reach the locking surface. Thus, after the locking portion of the elastic locking element, along with the elastic deformation of the elastic locking element, crosses the protrusion portion and reaches the locking surface, the user must withstand the elastic force of the elastic locking element to make the elastic locking element elastically deformed again so that the locking portion is able to reversely cross the protrusion portion and move away from the locking surface. In other words, the elastic locking element uses the elastic force thereof to firmly lock the cover at the main body, which can advance the capability of waterproof, dustproof and drop resistance.

Other objectives, features and advantages of the present invention will be further understood from the further technological features disclosed by the embodiments of the present invention wherein there are shown and described preferred embodiments of this invention, simply by way of illustration of modes best suited to carry out the invention

DESCRIPTION OF THE EMBODIMENTS

Figure 1:
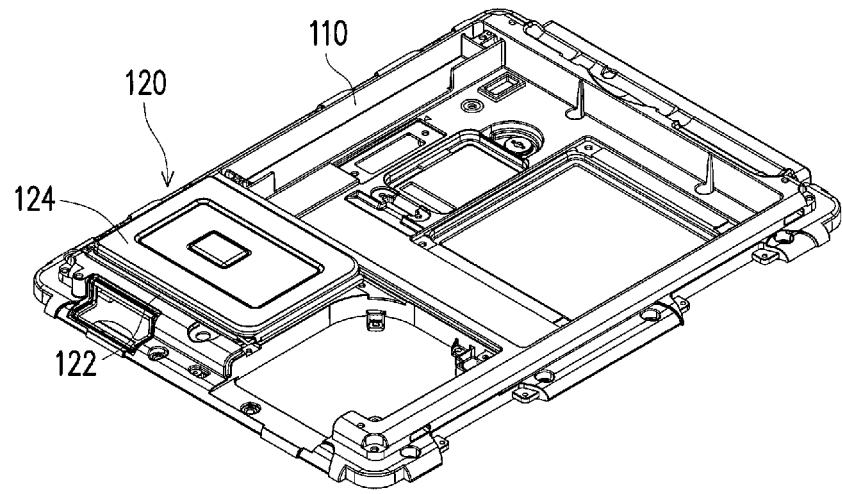
FIG. 1 is a three-dimensional diagram of an electronic device according to an embodiment of the disclosure.
Figure 2:
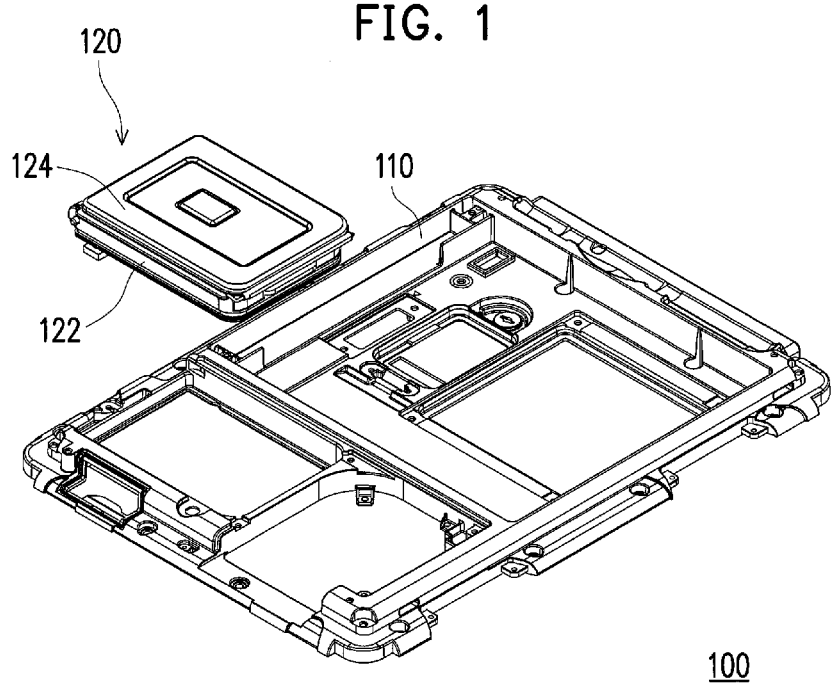
FIG. 2 is a three-dimensional diagram showing the containing case of FIG. 1 is separated from the casing.
Figure 3:
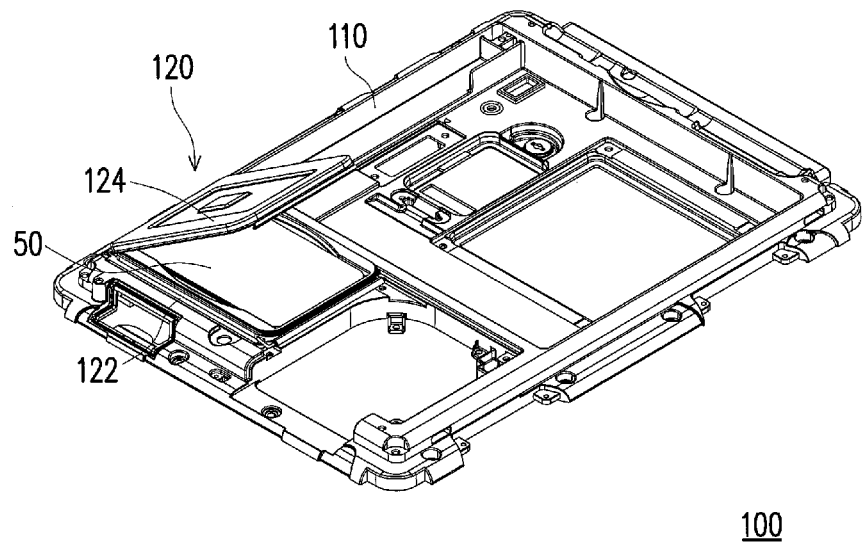
FIG. 3 is a three-dimensional diagram showing the cover of the containing case in FIG. 1 in open status.

FIG. 1 is a three-dimensional diagram of an electronic device according to an embodiment of the disclosure, FIG. 2 is a three-dimensional diagram showing the containing case of FIG. 1 is separated from the casing and FIG. 3 is a three-dimensional diagram showing the cover of the containing case in FIG. 1 in open status. For better illustration, only a part of an electronic device 100 is shown (casing 110). Referring to FIGS. 1-3, the electronic device 100 of the embodiment is, for example, a notebook computer and includes a casing 110 and a containing case 120. The containing case 120 includes a main body 122 and a cover 124. The casing 110 is, for example, the casing of a notebook computer. The main body 122 of the containing case 120 is, for example, a card reader for accommodating an IC card 50. The containing case 120 can be installed at the casing 110 as shown by FIG. 1 or separated from the casing 110 as shown by FIG. 2. In other embodiments, the main body 122 of the containing case 120 may be other appropriate devices and can be used to accommodate other appropriate objects, which the disclosure is not limited to.

Figure 4:
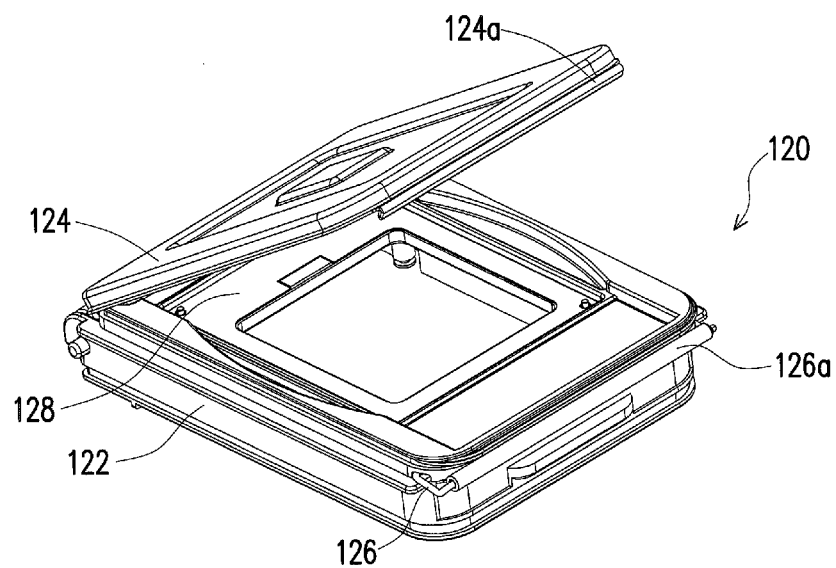
FIG. 4 is a three-dimensional diagram of the containing case of FIG. 3.
Figure 5:
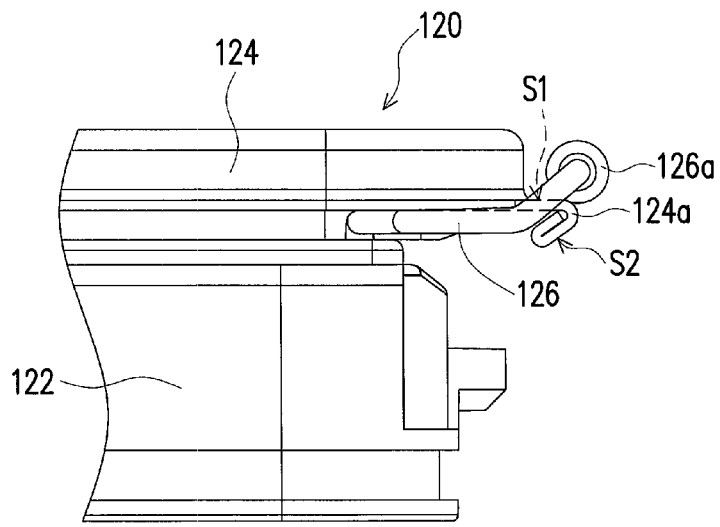
FIG. 5 is a partial side-view diagram of the containing case of FIG. 1.

FIG. 4 is a three-dimensional diagram of the containing case of FIG. 3 and FIG. 5 is a partial side-view diagram of the containing case of FIG. 1. Referring to FIGS. 4 and 5, the cover 124 is pivoted at the main body 122 and configured to be open from or closed at the main body 122 (in FIG. 4, it is in open status). The cover 124 has a protrusion portion 124a, a side of the protrusion portion 124a has a locking surface S1, and the other side of the protrusion portion 124a has a guiding slope S2. The containing case 120 further includes an elastic locking element 126 and the elastic locking element 126 is movably disposed at the main body 122 and has a locking portion 126a. When the elastic locking element 126 is in the status as shown by FIG. 5 and makes the locking portion 126a located at the locking surface S1, the cover 124 is locked at the main body 122 by the locking portion 126a.

Figure 6A:
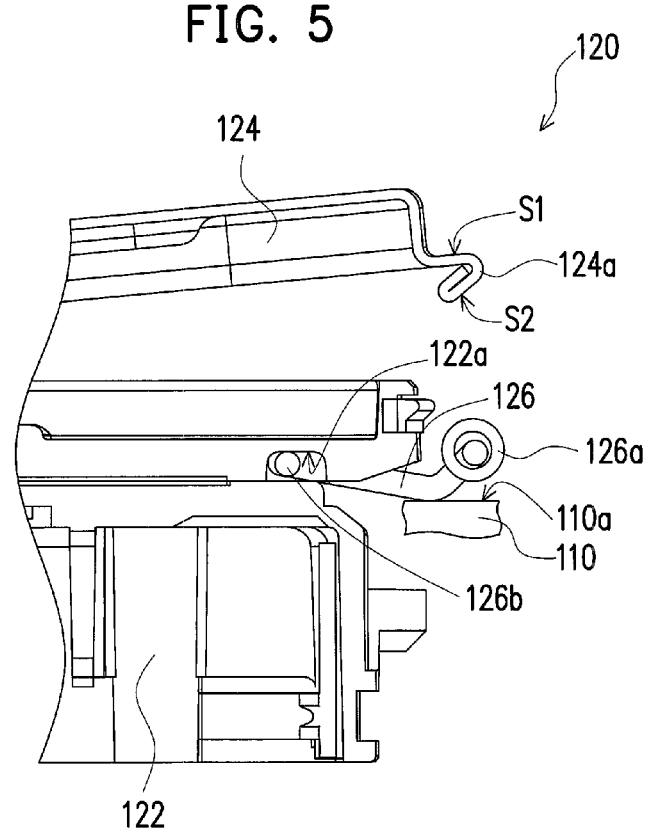
FIGS. 6A and 6B are cross-sectional diagrams showing the action flow of the elastic locking element of FIG. 5.
Figure 6B:
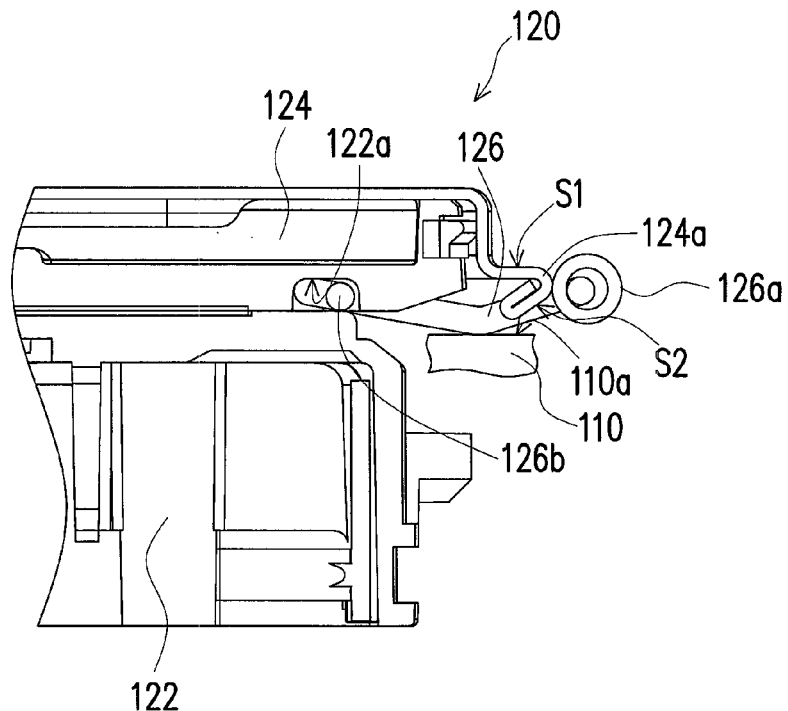

FIGS. 6A and 6B are cross-sectional diagrams showing the action flow of the elastic locking element of FIG. 5. When the cover 124 is closed to the main body 122 (as shown by FIGS. 6A and 6B) to drive the protrusion portion 124a to apply force onto the locking portion 126a of the elastic locking element 126 through the guiding slope S2 thereof, the elastic locking element 126 is elastically deformed, the locking portion 126a moves to the position as shown by FIG. 6B from the position as shown by FIG. 6A along the guiding slope S2, and finally, the locking portion 126a crosses the protrusion portion 124a as shown by FIG. 5 to reach the locking surface S1, so that the cover 124 is locked at the main body 122 by the locking portion 126a. Thus, when the user closes the cover 124 to the main body 122, the elastic locking element 126, driven by the cover 124, automatically locks the cover 124 to advance the operation convenience of the containing case 120.

Figure 7:
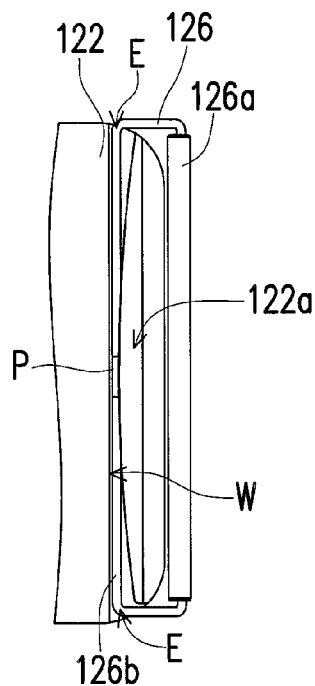
FIG. 7 is a partial bottom-view diagram of the main body and the elastic locking element in FIG. 6A.
Figure 8:
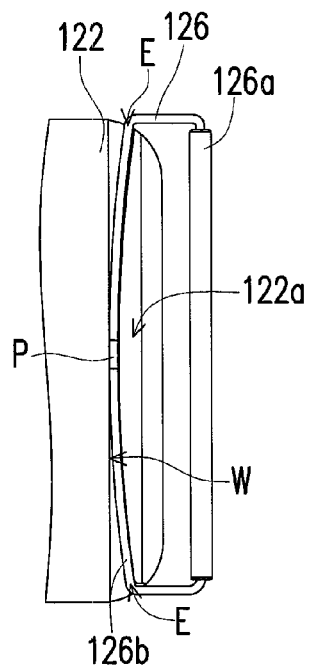
FIG. 8 is a partial bottom-view diagram of the main body and the elastic locking element in FIG. 6B.

FIG. 7 is a partial bottom-view diagram of the main body and the elastic locking element in FIG. 6A and FIG. 8 is a partial bottom-view diagram of the main body and the elastic locking element in FIG. 6B. While the protrusion portion 124a of the cover 124 is applying force onto the elastic locking element 126 as the description above, the locking portion 126a, by means of the elastic deformation (as shown by FIG. 7 to FIG. 8) of the elastic locking element 126, can move along the guiding slope S2 and cross the protrusion portion 124a to reach the locking surface S1. After the locking portion 126a of the elastic locking element 126, along with the elastic deformation of the elastic locking element 126, crosses the protrusion portion 124a and reaches the locking surface S1 as shown by FIG. 5, the user must withstand the elastic force of the elastic locking element 126 to make the elastic locking element 126 elastically deformed again as shown by FIG. 8 so as to allow the locking portion 126a reversely crossing the protrusion portion 124a and moving away from the locking surface S1. Then, the cover 124 is open from the main body 122 as shown by FIG. 6A. In other words, the elastic locking element 126 in the embodiment can firmly lock the cover 124 at the main body 122 by means of the elastic force thereof so as to advance the capability of waterproof, dustproof and drop resistance of the containing case 120.

Figure 9:
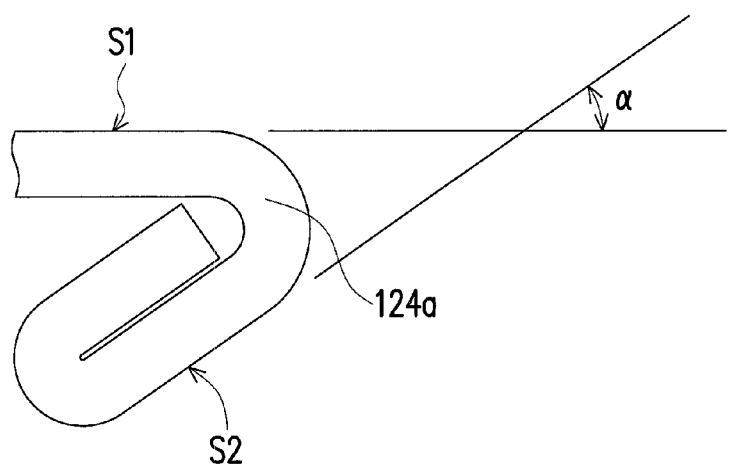
FIG. 9 is a schematic diagram of the protrusion portion of the cover in FIG. 5.

FIG. 9 is a schematic diagram of the protrusion portion of the cover in FIG. 5. Referring to FIG. 9, in the embodiment, the guiding slope S2 of the protrusion portion 124a has an inclination angle $\alpha$, for example, 35 degree towards the locking surface S1, which enables the cover 124 smoothly drive the locking portion 126a through the guiding slope S2 of the protrusion portion 124a from the status of FIG. 6A changed to the status of FIG. 5. In other embodiments, the inclination angle $\alpha$ of the guiding slope S2 relative to the locking surface S1 may be other appropriate angles depending on the design requirement, which the disclosure is not limited to.

Referring to FIGS. 6A-8, in more details, the locking portion 126a of the elastic locking element 126 in the embodiment is, for example, a roller, in which the roller is configured to contact the guiding slope S2 of the protrusion portion 124a and roll along the guiding slope S2 so that the locking portion 126a may smoothly move along the guiding slope S2. In addition, the main body 122 has a trench 122a, the elastic locking element 126 includes a rod portion 126b, and the rod portion 126b goes through and is disposed in the trench 122a. The elastic locking element 126 is configured to rotate relatively to the main body 122 by taking the rod portion 126b as the rotation shaft to drive the locking portion 126a for moving between the position as shown by FIG. 6A and the position as shown by FIG. 5.

Both ends E of the rod portion 126b are connected to the locking portion 126a as shown by FIG. 7. When the locking portion 126a moves along the guiding slope S2 as shown by FIGS. 6A and 6B, the locking portion 126a gradually moves away from the trench 122a and pulls the two ends E of the rod portion 126b to bend the rod portion 126b as shown by FIG. 8. At the time, by means of the elastic deformation of the rod portion 126b, the locking portion 126a can cross the protrusion portion 124a of the cover 124. In the embodiment, the width of the trench 122a is greater than the outer diameter of the rod portion 126b so that the rod portion 126b is suitable to be elastically deformed in the trench 122a. In addition, the rod portion 126b has a fulcrum P. The fulcrum P is located between the two ends E of the rod portion 126b. When the rod portion 126b is bent as shown by FIG. 8, the fulcrum P leans against the inner wall W of the trench 122a to enable the elastic locking element 126 stably act.

For better illustration, in FIGS. 6A and 6B, only a part of the casing 110 is shown. Referring to FIGS. 6A and 6B, in the embodiment, the casing 110 has a support surface 110a. The support surface 110a is used to support the elastic locking element 126 so that the elastic locking element 126 can be elastically deformed as shown by FIG. 6B by means of the force-applying of the protrusion portion 124a and rotate to the status of FIG. 5 by means of the guiding of the guiding slope S2 on the locking portion 126a.

Referring to FIG. 4, in the embodiment, a shockproof element 128 can be disposed on the main body 122 of the containing case 120. The material of the shockproof element 128 is, for example, foam or other suitable resilient material. When the cover 124 is closed at the main body 122, the shockproof element 128 provides shockproof function to further advance the capability of drop resistance of the containing case 120.

In summary, the containing case of the disclosure has an elastic locking element used for locking the cover. When the cover is closed to the main body to make the protrusion portion of the cover apply force onto the elastic locking element, the locking portion of the elastic locking element moves to the locking surface of the protrusion portion by means of the guiding of the guiding slope of the protrusion portion, such that the cover is locked at the main body. Therefore, when the user makes the cover closed to the main body, the elastic locking element, driven by the cover, can automatically lock the cover, which advances the operation convenience of the containing case. In addition, during applying force onto the elastic locking element by the protrusion portion of the cover, the locking portion, by means of the elastic deformation of the elastic locking element, can move along the guiding slope, cross the protrusion portion and reach the locking surface. Thus, after the locking portion of the elastic locking element, along with the elastic deformation of the elastic locking element, crosses the protrusion portion and reaches the locking surface, the user must withstand the elastic force of the elastic locking element to make the elastic locking element elastically deformed again so that the locking portion is able to reversely cross the protrusion portion and move away from the locking surface. In other words, the elastic locking element uses the elastic force thereof to firmly lock the cover at the main body, which can advance the capability of waterproof, dustproof and drop resistance. In addition, the locking portion of the elastic locking element can be a roller, in which the roller rolls along the guiding slope to enable the locking portion smoothly moving along the guiding slope and further to advance the action fluency of the elastic locking element.

It will be apparent to those skilled in the art that the descriptions above are several preferred embodiments of the disclosure only, which does not limit the implementing range of the disclosure. Various modifications and variations can be made to the structure of the disclosure without departing from the scope or spirit of the disclosure. The claim scope of the disclosure is defined by the claims hereinafter.

What is claimed is:

1. A containing case, suitable to be installed at a casing of an electronic device; the containing case comprising:
   a main body;
   a cover, pivoted at the main body and having a protrusion portion, wherein a side of the protrusion portion has a locking surface and the other side of the protrusion portion has a guiding slope; and
   an elastic locking element, movably disposed at the main body and having a locking portion, wherein when the cover is closed to the main body and drives the protrusion portion to apply force onto the elastic locking element, the elastic locking element is elastically deformed and the locking portion moves along the guiding slope in a direction away from the main body and then crosses the protrusion portion to reach the locking surface so that the cover is locked at the main body by the locking portion, wherein the main body has a trench, the elastic locking element comprises a rod portion, and the locking portion is gradually far away from the trench and pulls both ends of the rod portion to bend the rod portion.

2. The containing case as claimed in claim 1, wherein when the cover is closed to the main body, the protrusion portion applies force onto the locking portion of the elastic locking element through the guiding slope.

3. The containing case as claimed in claim 1, wherein an inclination angle of the guiding slope relative to the locking surface is 35 degree.

4. The containing case as claimed in claim 1, wherein the rod portion goes through and is disposed in the trench, and the elastic locking element is configured to rotate relatively to the main body by taking the rod portion as a rotation shaft.

5. The containing case as claimed in claim 4, wherein the two ends of the rod portion are connected to the locking portion.

6. The containing case as claimed in claim 5, wherein the rod portion has a fulcrum, the fulcrum is located between the two ends, and when the rod portion is bent, the fulcrum leans against an inner wall of the trench.

7. The containing case as claimed in claim 4, wherein a width of the trench is greater than an outer diameter of the rod portion so that the rod portion is suitable to be elastically deformed in the trench.

8. The containing case as claimed in claim 1, wherein the locking portion comprises a roller and the roller is configured to contact the guiding slope and roll along the guiding slope.

9. The containing case as claimed in claim 1, wherein the casing has a support surface, the support surface is for supporting the elastic locking element so that the elastic locking element is suitable to be elastically deformed by means of force-applying of the protrusion portion.

10. The containing case as claimed in claim 1, wherein the main body is a card reader and has an accommodation space, the accommodation space is suitable to accommodate an IC card and the cover is suitable to be closed at the main body to cover the accommodation space.

11. An electronic device, comprising:
a casing; and
a containing case, comprising:
   a main body, suitable to be installed at the casing;
   a cover, pivoted at the main body and having a protrusion portion, wherein a side of the protrusion portion has a locking surface and the other side of the protrusion portion has a guiding slope; and
   an elastic locking element, movably disposed at the main body and having a locking portion, wherein when the cover is closed to the main body and drives the protrusion portion to apply force onto the elastic locking element, the elastic locking element is elastically deformed and the locking portion moves along the guiding slope in a direction away from the main body and then crosses the protrusion portion to reach the locking surface so that the cover is locked at the main body by the locking portion, wherein the main body has a trench, the elastic locking element comprises a rod portion, and the locking portion is gradually far away from the trench and pulls both ends of the rod portion to bend the rod portion.

12. The electronic device as claimed in claim 11, wherein when the cover is closed to the main body, the protrusion portion applies force onto the locking portion of the elastic locking element trough the guiding slope.

13. The electronic device as claimed in claim 11, wherein an inclination angle of the guiding slope relative to the locking surface is 35 degree.

14. The electronic device as claimed in claim 11, wherein the rod portion goes through and is disposed in the trench, and the elastic locking element is configured to rotate relatively to the main body by taking the rod portion as a rotation shaft.

15. The electronic device as claimed in claim 14, wherein the two ends of the rod portion are connected to the locking portion.

16. The electronic device as claimed in claim 15, wherein the rod portion has a fulcrum, the fulcrum is located between the two ends, and when the rod portion is bent, the fulcrum leans against an inner wall of the trench.

17. The electronic device as claimed in claim 14, wherein a width of the trench is greater than an outer diameter of the rod portion so that the rod portion is suitable to be elastically deformed in the trench.

18. The electronic device as claimed in claim 11, wherein the locking portion comprises a roller and the roller is configured to contact the guiding slope and roll along the guiding slope.

19. The electronic device as claimed in claim 11, wherein the casing has a support surface, the support surface is for supporting the elastic locking element so that the elastic locking element is suitable to be elastically deformed by means of force-applying of the protrusion portion.

20. The electronic device as claimed in claim 11, wherein the main body is a card reader and is suitable to accommodate an IC card and the cover is suitable to be closed at the main body to cover the accommodation space.

* * * * *